US006701786B2

(12) United States Patent
Hulsing, II

(10) Patent No.: US 6,701,786 B2
(45) Date of Patent: Mar. 9, 2004

(54) CLOSED LOOP ANALOG GYRO RATE SENSOR

(75) Inventor: Rand H. Hulsing, II, Redmond, WA (US)

(73) Assignee: L-3 Communications Corporation, New York, NY (US)

(*) Notice: Subject to any disclaimer, the term of this patent is extended or adjusted under 35 U.S.C. 154(b) by 79 days.

(21) Appl. No.: 10/136,525

(22) Filed: Apr. 29, 2002

(65) Prior Publication Data

US 2003/0200807 A1 Oct. 30, 2003

(51) Int. Cl.[7] ............................................. G01P 15/00
(52) U.S. Cl. ................... 73/514.02; 73/504.04; 73/514.18; 73/504.16
(58) Field of Search ................. 73/514.01, 514.02, 73/514.15, 514.17, 514.18, 514.16, 514.29, 504.02, 504.03, 504.04, 504.12, 514.38

(56) References Cited

U.S. PATENT DOCUMENTS

| | | |
|---|---|---|
| 4,336,718 A | 6/1982 | Washburn |
| 4,825,335 A | 4/1989 | Wilner |
| 5,005,413 A | 4/1991 | Novack et al. |
| 5,111,694 A | 5/1992 | Foote |
| 5,165,279 A | 11/1992 | Norling et al. |
| 5,168,756 A | 12/1992 | Hulsing, II |
| 5,205,171 A | 4/1993 | O'Brian et al. |
| 5,241,861 A | 9/1993 | Hulsing, II |
| 5,319,976 A | 6/1994 | Hulsing, II |
| 5,331,854 A | 7/1994 | Hulsing, II |
| 5,350,189 A | 9/1994 | Tsuchitani et al. |
| 5,557,046 A | 9/1996 | Hulsing, II |
| 5,627,314 A | 5/1997 | Hulsing, II |
| 6,079,271 A | 6/2000 | Hulsing, II |
| 6,098,462 A | 8/2000 | Hulsing, II |
| 6,273,514 B1 * | 8/2001 | Hulsing, II .................. 310/306 |
| 6,276,203 B1 * | 8/2001 | Hulsing, II .............. 73/504.03 |
| 6,285,111 B1 * | 9/2001 | Hulsing, II .................. 310/306 |

* cited by examiner

Primary Examiner—Richard A. Moller
(74) Attorney, Agent, or Firm—Proskauer Rose LLP

(57) ABSTRACT

The present invention provides an apparatus and method for measuring the angular rotation of a moving body. The apparatus comprises an upper sensor layer, a lower handle layer substantially parallel to the sensor layer, at least one dither frame formed of the upper sensor layer, the frame having a dither axis disposed substantially parallel to the upper sensor layer and the lower handle layer. The apparatus further comprises a first accelerometer formed of the upper sensor layer and having a first force sensing axis perpendicular to the dither axis for producing a first output signal indicative of the acceleration of the moving body along the first force sensing axis, the first accelerometer having a proof mass and at least one flexure connecting the proof mass to the dither frame such that the proof mass can be electrically rotated perpendicular to the dither axis. The apparatus also comprises a second accelerometer formed of the upper sensor layer and having a second force sensing axis perpendicular to the dither axis for producing a second output signal indicative of the acceleration of the moving body along the second force sensing axis, the second accelerometer having a proof mass and at least one flexure connecting the proof mass to the dither frame such that the proof mass can be electrically rotated perpendicular to the dither axis. The dither frame and proof masses have electrodes on an insulating layer for operating the first and second accelerometers and the upper sensor layer has a rate axis perpendicular to each of the first and second force sensing axes and the dither axis, whereby the first and second output signals have a Coriolis component indicative of the angular rotation of the moving body about the rate axis.

43 Claims, 7 Drawing Sheets a.) Sensor Diagram

CLOSED LOOP ANALOG GYRO RATE SENSOR

BACKGROUND

1. Technical Field of the Invention

The present invention relates to an apparatus and methods for determining the acceleration and rate of angular rotation of a moving body, and in particular, one which is adapted to be formed, for example through micromachining, from a silicon substrate.

2. Description of the Prior Art

A variety of methods and systems are known for determining the acceleration and rate of angular rotation of a moving body. Such methods and systems have found their way in a diverse range of applications, one of which is military. However, the use of tactical grade inertia measuring units has been limited by their cost to high-priced systems such as military aircraft, missiles, and other special markets. The cost of inertia measuring units is dominated by the expensive discrete gyroscopes and discrete accelerometers and attendant electronics used to drive and convert these signals for use in computer systems.

Other problems with inertial measuring units are high power consumption and large package size. The problems of high power consumption and large package size further limit applications to larger equipment boxes in equipment racks. For example, a hockey puck sized tactical grade navigator is not known in the prior art.

Still other problems with the prior art, discussed below in more detail, include a limitation in rate bias accuracy caused by modulation of the accelerometer due to coupling from the dither motion which causes phase angle sensitivity of the rate data. A further limitation in rate bias accuracy is caused by modulation of the accelerometer due to coupling of external vibration components coupling into the rate data.

Exemplary rate and acceleration sensors, components of such sensors, and methods of forming the same are described in the following patents all of which are assigned to the assignee of this disclosure: U.S. Pat. Nos. 5,005,413; 5,168,756; 5,319,976; 5,331,242; 5,331,854; 5,341,682; 5,367,217; 5,456,110; 5,456,111; 5,557,046; 5,627,314; 6,079,271; 6,098,462; and 6,276,203.

By way of background, the rate of rotation of a moving body about an axis may be determined by mounting an accelerometer on a frame and dithering it, with the accelerometer's sensitive axis and the direction of motion of the frame both normal to the rate axis about which rotation is to be measured. For example, consider a set of orthogonal axes X, Y and Z oriented with respect to the moving body. Periodic movement of the accelerometer along the Y axis of the moving body with its sensitive axis aligned with the Z axis results in the accelerometer experiencing a Coriolis acceleration directed along the Z axis as the moving body rotates about the X axis. A Coriolis acceleration is that perpendicular acceleration developed while the body is moving in a straight line, while the frame on which it is mounted rotates. This Coriolis acceleration acting on the accelerometer is proportional to the velocity of the moving sensor body along the Y axis and its angular rate of rotation about the X axis. An output signal from the accelerometer thus includes a DC or slowly changing component or force signal F representing the linear acceleration of the body along the Z axis, and a periodic component or rotational signal $\Omega$ representing the Coriolis acceleration resulting from rotation of the body about the X axis.

The amplitude of that Coriolis component can be produced by vibrating the accelerometer, causing it to dither back and forth along a line perpendicular to the input axis of the accelerometer. Then, if the frame on which the accelerometer is mounted is rotating, the Coriolis acceleration component of the accelerometer's output signal will be increased proportional to the dither velocity. If the dither amplitude and frequency are held constant, then the Coriolis acceleration is proportional to the rotation rate of the frame.

The linear acceleration component and the rotational component representing the Coriolis acceleration may be readily separated by using two accelerometers mounted in back-to-back relationship to each other and processing their output signals using summed difference techniques. In U.S. Pat. No. 4,510,802, assigned to the assignee of the present invention, two accelerometers are mounted upon a parallelogram with their input axes pointing in opposite directions. An electromagnetic D' Arsonval coil is mounted on one side of the parallelogram structure and is energized with a periodically varying current to vibrate the accelerometers back and forth in a direction substantially normal to their sensitive or input axes. The coil causes the parallelogram structure to vibrate, dithering the accelerometers back and forth. By taking the difference between the two accelerometer outputs, the linear components of acceleration are summed. By taking the sum of the two outputs, the linear components cancel and only the Coriolis or rotational components remain.

U.S. Pat. No. 4,590,801, commonly assigned to the assignee of the present invention, describes the processing of the output signals of two accelerometers mounted for periodic, dithering motion to obtain the rotational rate signal $\Omega$ and the force or acceleration signal F representing the change in velocity, i.e. acceleration, of the moving body along the Z axis.

U.S. Pat. No. 4,510,802, commonly assigned to the assignee of the present invention, describes a control pulse generator, which generates and applies a sinusoidal signal of a frequency $\omega$ to the D' Arsonval coil to vibrate the parallelogram structure and thus the first and second accelerometer structures mounted thereon, with a dithering motion of the same frequency $\omega$. The accelerometer output signals are applied to a processing circuit, which sums the accelerometer output signals to reinforce the linear components indicative of acceleration. The linear components are integrated over the time period T of the frequency $\omega$ corresponding to the dither frequency to provide the force signal F, which represents the change in velocity, i.e., acceleration, along the Z axis. The accelerometer output signals are also summed, whereby their linear components cancel and their Coriolis components are reinforced to provide a signal indicative of frame rotation. That difference signal is multiplied by a zero mean periodic function sgnc ($\omega$t). The resulting signal is integrated over a period T of the frequency $\omega$ by a sample and hold circuit to provide the signal $\Omega$ representing the rate of rotation of the frame.

The D' Arsonval coil is driven by a sinusoidal signal of the same frequency $\omega$ which corresponded to the period T in which the linear acceleration and Coriolis component signals were integrated. In particular, the pulse generator applies a series of pulses at the frequency $\omega$ to a sine wave generator, which produces the substantially sinusoidal voltage signal to be applied to the D' Arsonval coil. A pair of pick-off coils produce a feedback signal indicative of the motion imparted to the accelerometers. That feedback signal is summed with the input sinusoidal voltage by a summing junction, whose output is applied to a high gain amplifier.

The output of that amplifier, in turn, is applied to the D' Arsonval type drive coil. The torque output of the D' Arsonval coil interacts with the dynamics of the parallelogram structure to produce the vibrating or dither motion. In accordance with a well known in the art servo theory, the gain of the amplifier is set high so that the voltage applied to the summing junction and the feedback voltage are forced to be substantially equal and the motion of the mechanism will substantially follow the drive voltage applied to the summing junction.

U.S. Pat. No. 4,881,408 describes the use of vibrating beam force transducers in accelerometers. In U.S. Pat. No. 4,372,173, the force transducer takes the form of a doubleended tuning fork fabricated from crystalline quartz. The transducer comprises a pair of side-by-side beams which are connected to common mounting structures at their ends. Electrodes are deposited on the beams and a drive circuit applies a periodic voltage signal to the electrodes, causing the beams to vibrate toward and away from one another, 180 degrees out of phase. In effect, the drive circuit and beams form an oscillator with the beams playing the role of a frequency controlled crystal, i.e., the mechanical resonance of the beams controls the oscillation frequency. The vibrating beams are made of crystalline quartz, which has piezoelectric properties. Application of periodic drive voltages to such beams cause them to vibrate toward and away from one another, 180 degrees out of phase. When the beams are subjected to accelerating forces, the frequency of the mechanical resonance of the beams changes, which results in a corresponding change in the frequency of the drive signal. When subjected to acceleration forces that cause the beams to be placed in tension, the resonance frequency of the beams and thus the frequency of the drive signal increases. Conversely, if the beams are placed in a compression by the acceleration forces, the resonance frequency of the beams and the frequency of the drive signal is decreased.

Above referenced U.S. Pat. No. 5,005,413 describes accelerometers utilizing vibrating force transducers that require materials with low internal damping to achieve high Q values that result in low drive power, low self-heating and insensitivity to electronic component variations. Transducer materials for high-accuracy instruments also require extreme mechanical stability over extended cycles at high stress levels. Crystalline silicon possesses high Q values, and with the advent of low cost, micromachined mechanical structures fabricated from crystalline silicon, it is practical and desirable to create vibrating beams from a silicon substrate. Commonly assigned U.S. Pat. No. 4,912,990 describes a vibrating beam structure fabricated from crystalline silicon and including an electric circuit for applying a drive signal or current along a current path that extends in a first direction along a first beam and in a second, opposite direction along a second beam parallel to the first. A magnetic field is generated that intersects substantially perpendicular the conductive path, whereby the first and second beams are caused to vibrate towards and away from one another, 180 degrees out of phase.

Digital techniques employ stable, high frequency crystal clocks to measure a frequency change as an indication of acceleration forces applied to such vibrating beam accelerometers. To ensure precise integration or cosine demodulation, a crystal-clock is used to set precisely the frequency of the dither drive signal. Outputs from two accelerometers are fed into counters to be compared to a reference clock signal produced by the crystal clock. A microprocessor reads the counters and processes the data to provide a force signal F and a rotational signal $\Omega$. The main advantage of digital processing is the ability to demodulate with extreme precision. The short term stability of the reference crystal clock allows the half cycle time basis to be precisely equal. Thus, a constant input to the cosine demodulator is divided up into equal, positive half cycle and negative half cycle values, whose sum is exactly zero.

In an illustrative embodiment, the two accelerometer signals are counted in their respective counters over a 100 Hz period (corresponding to 100 Hz of the dither frequency ω)) and are sampled at a 400 Hz data rate corresponding to each quarter cycle of the dither motion. The two accumulated counts are subtracted to form the force signal F. Since the counters act as an integrator, the acceleration signal is changed directly to a velocity signal. Taking the difference of the acceleration signals tends to reject all Coriolis signals as does the counter integration and locked period data sampling.

The Coriolis signals are detected by a cosine demodulation. The cosine demodulated signals from the first and second accelerometers are summed to produce the $\Delta\theta$ signal. Again, the counters integrate the rate data to produce an angle change. The sum also eliminates any linear acceleration and the demodulation cancels any bias source including bias operating frequency and accelerometer bias. The accelerometer temperature is used in a polynomial model to provide compensation for all the coefficients used to convert the frequency counts into output units. Thus, the scale factor, bias and misalignment of the sensor axes are corrected over the entire temperature range.

The demodulation of the frequency sample is straightforward once the data is gathered each quarter cycle. The cosine demodulation is simply the difference between the appropriate half cycles. The linear acceleration is the sum of all samples.

Various issues with the use of vibrating beam force transducers in accelerometers include the need to operate the device in a substantial vacuum such that the beams can vibrate at their natural frequency without loss of energy from viscous damping. Also, the vibrating beams of the first and second accelerometers are formed in first and second layers of epitaxial material formed on opposing sides of the silicon substrate so that the force sensing axis of each accelerometer is directed opposite to the direction of the other. In other words, the vibrating beams must be on opposing sides of the substrate so that one will be in compression and the other in tension when subjected to an applied acceleration force. The high doping levels in the epitaxial layer required to form the vibrating beams make the material inherently unstable. Thus, the output of the vibrating beams tends to degrade over time and with exposure to thermal environments. The nature of vibrating beam transducers causes accelerometer design and analysis to be relatively complex as compared to that of simpler force rebalance accelerometers and their larger size reduces the quantity of accelerometers which can be fabricated in a single wafer of silicon substrate so that vibrating beam accelerometers are inherently more expensive to produce than miniature force rebalance accelerometers.

Miniature silicon force-rebalance accelerometers in an integrated circuit form are small and inexpensive and generally have a large dynamic range and are operable in high vibration environments over a wide temperature range. Miniature silicon force-rebalance accelerometers having a silicon proof mass suspended between a pair of electrode layers and responsive to differential capacitive coupling between the electrode layers and the proof mass for opposing acceleration forces applied to the proof mass are described in U.S. Pat. No. 4,336,718. The miniature silicon force-rebalance accelerometer of the prior art includes a proof mass and two flexures integrally formed from a silicon substrate. The flexure preferably defines a bend line along the mid-plane of the proof mass which is intended to minimize vibration rectification. The silicon substrate including the proof mass is anodically bonded between upper and lower glass substrates having upper and lower metal, for example, gold, electrodes deposited thereon. The upper and lower substrates are preferably formed identically. Symmetry between opposing surfaces of the proof mass and between opposing the electrodes deposited on the upper and lower glass substrates surfaces minimizes bias and maximizes dynamic range and linearity.

The state of the art in micromachined rate and acceleration sensors is represented by U.S. Pat. No. 5,341,682 which is commonly assigned to the assignee of the present invention and incorporated herein by reference. Rate and acceleration sensors, as disclosed in U.S. Pat. No. 5,341,682, are comprised of two accelerometers aligned in a single plane such that the input or sensitive axes of the two accelerometers are parallel and the output or hinge axes of the two accelerometers are parallel. The two accelerometers are vibrated or dithered at a predetermined frequency along a dither axis parallel to the hinge axes. The two accelerometers tend to vibrate at slightly different frequencies due to slight mass mismatch. Even if driven by a drive signal of common frequency, the accelerometer motions tend to be out of phase with each other. A link is connected to each of the two accelerometers whereby motion imparted to one accelerometer results in like, but opposite motion imparted to the other accelerometer. Thus, the dithering motion imparted to one accelerometer is ideally of the exact same frequency and precisely 180 degrees out of phase with that applied to the other accelerometer.

The link provides an interconnect between the two accelerometers which is stiff in the dither axis such that the motion imparted to one accelerometer is effectively transmitted to the other accelerometer and both accelerometers ideally dither at the same frequency and precisely 180 degrees out of phase. The link is pivotally fixed to the frame by a pivot flexure. The link is further connected to each of the two accelerometers by flexures. The link is typically formed in a complex asymmetric shape. The complexity of the link is driven by practical considerations involved in adapting the link to accommodate both, the pivot flexure and the two link-to-accelerometer flexures. The link's complex asymmetric shape provides adequate clearance between the link and the frame for the pivot flexure. The link's shape also provides adequate clearance between the link and each accelerometer to provide the precise flexure length to ensure that the flexures exhibit a predetermined mix of simple arc bending and "S-bend" motion and to ensure that any motion imparted to one accelerometer by the flexures is imparted to the other accelerometer as a sinusoidal function without introducing a higher order harmonic into the translation motion.

Although the device described in above referenced U.S. Pat. No. 5,341,682 functions for the purposes intended, its exact behavior is difficult to predict and/or model analytically. For example, the complex shape of prior links results in spring rates which are asymmetrical and a shape which is difficult to solve analytically. Additionally, constructing the shape previously taught results in flexures whose thicknesses and hence vibration properties are difficult to control. Therefore, later patents, for example, U.S. Pat. No. 6,098, 462 and U.S. Pat. No. 6,079,271, provide links having simple geometric shapes formed symmetrically about the pivot point. The behavior of these simpler symmetric links is more easily predicted and/or modeled analytically. For example, these simpler symmetric links result in spring rates which are symmetrical and easier to solve analytically using conventional methods. Additionally, constructing the simpler symmetric shape results in flexures whose thicknesses and hence vibration properties are more easily controlled.

U.S. Pat. No. 6,098,462, which is commonly assigned to the assignee of the present invention, provides a linkage between accelerometers in a micromachined rate and acceleration sensor which is relatively simple to solve analytically and results in flexures whose thicknesses are relatively insensitive to process variations. For example, the link shape can be solved using classical mechanical equations. In addition, the U.S. Pat. No. 6,098,462 provides a simple symmetrically shaped link, which is relatively insensitive to process variations, having sufficient mechanical stiffness to effectively transmit motion imparted to one accelerometer to the other accelerometer such that both accelerometers dither at the same frequency and precisely 180 degrees out of phase. The simple symmetrical link provides adequate clearance between the link and each accelerometer for flexures having a length which ensures that the flexures exhibit a predetermined mix of simple arc bending and "S-bend" motion and which ensures that any motion imparted to one accelerometer by the flexures is imparted to the other accelerometer as a sinusoidal function without introducing a higher order harmonic into the translation motion. The link having a columnar shape in the dither cross-axis has a reduced sensitivity to cross-axis vibration.

As described in U.S. Pat. No. 5,341,682, the accelerometers are suspended from a dither or mounting frame by a pair of flexures or "dither legs" which vibrate upon application of a dithering force to translate the accelerometers in a predominantly linear relationship with each other. However, true orthogonality is not achieved between the dither motion and the Coriolis acceleration sensing direction in the normal manufacturing process. State of the art micromachined vibrating Coriolis rate and acceleration sensors, as represented by U.S. Pat. No. 5,341,682 and others of the above incorporated patents, experience quadrature motion due to the manifold sources of mechanical imperfection resulting from the tolerances inherent in manufacturing processes. This axis misalignment in conjunction with a phase shift causes a rate bias error which limits performance.

One method and apparatus for overcoming the errors introduced by quadrature motion is described in U.S. Pat. No. 5,886,259, assigned to the assignee of the present invention, steers the accelerometer input axes to be orthogonal using capacitive attraction between the sensing mass and stationary members of the sensor frame. However, such capacitive steering requires very small gaps, on the order of microns, between the sensing mass and stationary members to generate sufficient applied force. Given the very small gaps necessary, actual implementation of this axis alignment feature is difficult in a normal manufacturing setting using conventional processing methods.

The prior art as discussed above, however, has proven unsatisfactory. Generally, the Coriolis rate sensors have the problem of difficult fabrication, lengthy analysis and hard to implement axis-alignment capability. The result of such shortcomings is less than optimal yields, low quantity of sensors per wafer, higher design costs and limited rate bias performance.

Accordingly, it is clear that there exists a need for a cost effective method and apparatus for determining the acceleration and rate of angular rotation of a moving body which overcomes the above mentioned problems.

SUMMARY OF THE INVENTION

Accordingly, the present invention relates to a system and method for accurate and low cost measurement of rate and linear acceleration in a high volume design. The method includes automatically nulling out the modulation using closed loop electronics without the need for mechanical sensor trimming or extraordinary processing tolerances.

In accordance with one embodiment of the present invention, a system is provided using a self contained steering mechanism for axis-alignment correction as well as measuring both rate and linear acceleration. The system comprises an analog closed loop alignment servo, a pair of capacitive force rebalanced accelerometers, a unique magnetically driven dither mechanization using a compact link and self-contained damping plates for the accelerometers.

In accordance with another embodiment of the present invention, a method of axis-alignment is provided. The method comprises the steps of fabricating into the accelerometer a rotational feature to allow the force rebalance to operate a robust axis-alignment correction. The present invention provides an apparatus and method for measuring the angular rotation of a moving body. The apparatus comprises an upper sensor layer, a lower handle layer substantially parallel to the sensor layer, at least one dither frame formed of the upper sensor layer, the frame having a dither axis disposed substantially parallel to the upper sensor layer and the lower handle layer. The apparatus further comprises a first accelerometer formed of the upper sensor layer and having a first force sensing axis perpendicular to the dither axis for producing a first output signal indicative of the acceleration of the moving body along the first force sensing axis, the first accelerometer having a proof mass and at least one flexure connecting the proof mass to the dither frame such that the proof mass can be electrically rotated perpendicular to the dither axis. The apparatus also comprises a second accelerometer formed of the upper sensor layer and having a second force sensing axis perpendicular to the dither axis for producing a second output signal indicative of the acceleration of the moving body along the second force sensing axis, the second accelerometer having a proof mass and at least one flexure connecting the proof mass to the dither frame such that the proof mass can be electrically rotated perpendicular to the dither axis. The dither frame and proof masses have electrodes on an insulating layer for operating the first and second accelerometers and the upper sensor layer has a rate axis perpendicular to each of the first and second force sensing axes and the dither axis, whereby the first and second output signals have a Coriolis component indicative of the angular rotation of the moving body about the rate axis.

It is to be understood that both the foregoing summary and the following detailed description of the present invention are exemplary and are intended to provide a description of, and not limit, the present invention.

The present invention will now be described in greater detail, with frequent reference being made to the drawings identified below.

DETAILED DESCRIPTION OF THE PREFERRED EMBODIMENT(S)

Figure 1:
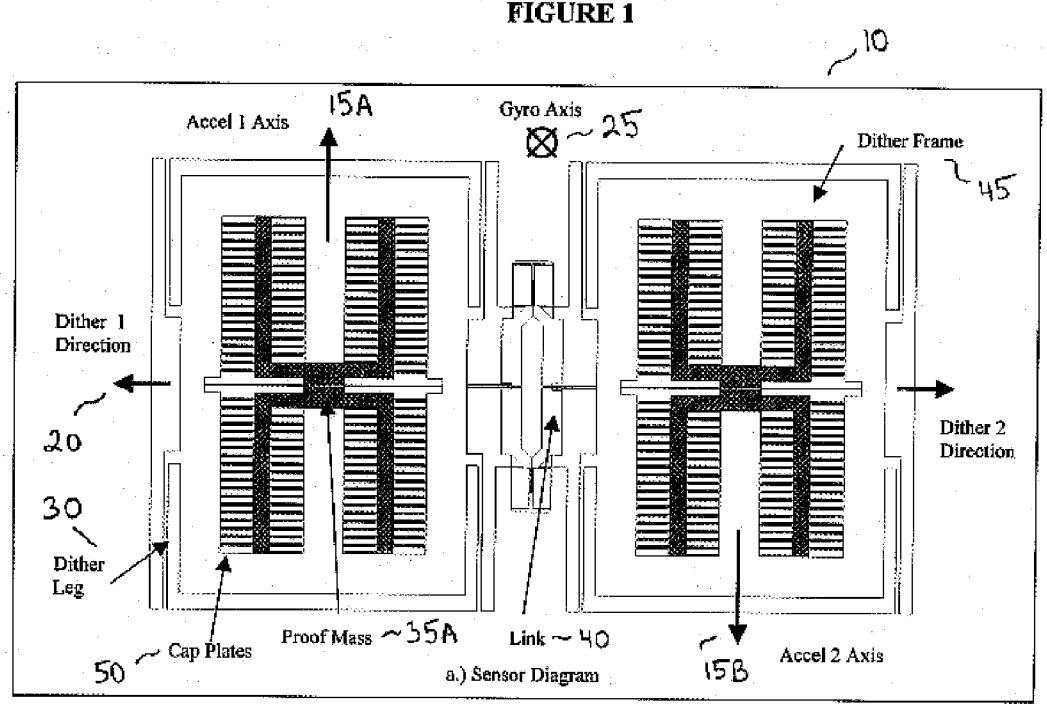
FIG. 1 is a diagram of a sensor in accordance with one embodiment of the present invention.

The following description is presented to enable any person of ordinary skill in the art to make and practice the present invention. Modifications to the preferred embodiment will be readily apparent to those of ordinary skill in the art, and the disclosure set forth herein may be applied to other embodiments and applications without departing from the spirit and scope of the present invention and the appended claims. Thus, the present invention is not intended to be limited to the embodiments described, but is to be accorded the broadest scope consistent with the claims appended hereto and the disclosure set forth herein.

The present invention relates to an analog silicon version of L-3 Communications' existing vibrating beam, bulk etched, rate and acceleration sensor, which is a part of L-3 Communications' existing μIMU (micro Inertial Measurement Unit). Inertial Measurement units (IMUs) are critical to the operation of inertial navigation and guidance systems. Such systems are used on ships, aircraft, spacecraft, etc. A typical IMU utilizes a cluster of three accelerometers and three gyros mounted to a structure which is shock isolated. The three accelerometers are used to measure linear acceleration while the gyros are used to measure angular rate.

The vibrating beam multi-sensor is known in the industry as μSCIRAS™ (Micromachined Silicon Coriolis Inertial Rate and Acceleration Sensor). The analog sensor version of μSCIRAS™ (referred to as the "closed-loop analog" or CLA) in accordance with the present invention is a magnetic drive, capacitive pickoff rate and acceleration sensor with an axis-alignment servo. Preferably, the sensor has less than 1°/hr bias instability. While the key features of the closed loop gyro according to the present invention are implemented in a thinner version of μSCIRAS, a simpler deep reactive ion etch (DRIE) process is preferably employed.

The analog CLA design in accordance with the present invention uses similar etching processes as the current bulk-etched sensor which is well known in the art. However, using DRIE to define an 80 micron thick, two-dimensional projection, a much simpler process is employed to fabricate the gyro and accelerometer according to one embodiment of the present invention. Since the entire moving portion of the sensor is a uniform 80 microns thick, local processing variations are nulled out using electrostatic forces in a servo loop driven by an error detector.

In accordance with the preferred embodiment of the present invention, a 1°/Hr rate bias stability, less than 0.5 mg accelerometer bias stability, and better than 0.1°/√Hr rate random walk are achieved. The analog gyro approach of the present invention has the advantage of being able to filter the signals to achieve a low noise for the angle random walk. By incorporating a closed loop alignment servo, the rate bias can be achieved without manual trimming.

The 1°/hr rate sensor would fit such programs as WCMD (Wind Corrected Munition Dispenser) or other GPS-aided inertial navigation programs. The ideal sensor for such a program would be a silicon based, axis-alignment corrected rate sensor with very low inherent power. Preferably, a magnetic drive, capacitive pickoff rate sensor with an axis-alignment servo, would be less than 1°/hr bias over temperature in accordance with the present invention. An active axis-alignment would essentially eliminate rate bias as the dominant error source. The same sensor would exhibit less than 0.05 deg/√hr.

Basic Concept

The basic rate and acceleration sensor for one axis consists of a single silicon mechanism mounted on an electronic hybrid substrate with the necessary analog drive electronics. According to the embodiment of the present invention, several of the key trade-offs have been made with respect to general configuration. The size of the sensor in accordance with the present invention is approximately ⅕ th of the current well known in the art bulk silicon μSCIRAS™. This provides a production capability of about 250 sensors per 200 mm-wafer, which is an increase of about 5 times the production employed by the prior art. The wafers are the standard thickness of 680 μm, with very light doping levels.

FIG. 1 illustrates one embodiment of the upper sensor layer arrangement containing a rate and acceleration sensor 10 according to the present invention. The size of the diced wafer including a top cover and the sensor is about 0.27"× 0.27" or about 6.8 mm squared compared with the existing prior art mechanism of 0.7"×0.55".

The upper sensor layer is grown by known methods on one surface of unitary, silicon substrate. First and second accelerometers are micromachined from the upper sensor layer and are disposed in side-by-side relation such that their input axes 15A and 15B are disposed in parallel but opposite directions. In FIG. 1, input axis 15A of the first accelerometer is disposed to the top of the page, whereas input axis 15B of the second accelerometer is disposed to the bottom of the page. Further, input axes 15A and 15B are disposed perpendicular to a dither or vibration axis 20 and to a rate axis 25. As is well known in the art, the first and second accelerometers will respond to linear acceleration along their input axes 15A and 15B, respectively, and to rotation of the upper sensor layer about its rate axis 25.

The upper sensor layer includes a mounting frame. Each of accelerometers is rotationally suspended relative to the upper sensor layer by a pair of hinge flexures. Hinge flexures are well known in the art. For example, U.S. Pat. No. 6,257,057 teaches that the length of each of hinge flexures is selected to provide a spring rate relative to the mass of accelerometers, that will cause hinge flexures to flex in a predominately simple bending motion combined with a component of "S-bend" motion when subjected to an acceleration force applied along input axis 15. Hinge flexures do double duty and act to transmit the dither motion to the accelerometers in the plane of the upper sensor layer. Each of dither flexures are preferably formed of one or more narrow beams 30, upon which conductive paths are deposited. Configuring dither flexures to have multiple narrow beams or "legs" decreases the in-plane stiffness thereby minimizing the force that drives the dither motion. The spring rate of narrow beams or legs 30 of dither flexures is proportional to $W^3/L^3$ in the plane of the upper sensor layer, where W is the width of legs and L is the length of legs. The length L and width W of hinge legs 30 are set such that when rotational motion is applied in the plane of the upper sensor layer, legs 30 resist motion. In response to a Coriolis acceleration, the proofmass flexures will flex in an "S" configuration. Such "S-bend" flexures permit accelerometers to translate with predominantly linear motion in the plane of the upper sensor layer, i.e., the plate surfaces of proof masses 35A, 35B of accelerometers remain substantially parallel to the surfaces of the upper sensor layer and to each other as they are translated along their respective input axes 15A and 15B.

Magnet and flux path with case return provide a magnetic path for directing the flux emanating from the magnet through the upper sensor layer. As will be explained, the configuration and disposition of accelerometers within upper sensor layer permits a simple, straightforward magnetic flux path to effect the operation of the dithering motion of accelerometers. Upon application of a periodic drive signal or current to conductive path via external connectors, interaction with a magnetic field emanating from magnet substantially perpendicular to the surface of the upper sensor layer subjects accelerometers to a periodic dithering motion along common dither axis 20.

A link 40 is connected to each frame opposite hinge flexures to insure that the dithering motion imparted to one of the accelerometers will be of the same frequency and in interconnects first and second accelerometers so that any motion, including dithering motion and extraneous motions applied to one of first and second accelerometers, will also be applied in precisely equal and opposite fashion to the other one of first and second accelerometers. In this fashion, the outputs of accelerometers may be processed simply by well known sum and difference techniques to provide a force signal F and the rotational signal Ω, as well as to cancel out erroneous signals. Without link 40 therebetween, accelerometers would tend to vibrate at slightly different frequencies due to slight mass mismatch. Even if driven by a drive signal of common frequency, the motions of the accelerometers would tend to be out of phase with each other. Link 40 is connected by flexures to the moving side of the first frame opposite to dither flexures, which mount the first accelerometer to the mounting frame. Link 40 is similarly connected by a second dither flexure to the moving side of the second accelerometer opposite to dither flexures, which mount the second accelerometer to the mounting frame. Link 40 is preferably axes-symmetric about a pivot point and, according to one preferred embodiment, is symmetrically shaped. Alternatively, link 40 is any of a complex asymmetric 'U' shape as described in U.S. Pat. No. 5,241,861 or a simple 'U' shape symmetric about pivot point as described in each of U.S. Pat. No. 6,098,462 and 6,079,271. Link 40 is supported by two pivot flexures. Pivot flexures are in turn mounted along a center axis of the upper sensor layer by support members, which are in turn affixed to an accelerometer frame 45.

Those of ordinary skill in the art will recognize that proof masses 35A and 35B are subject to motion in the plane of the upper sensor layer along respective input axes 15 in response to linearly applied acceleration forces. Furthermore, those of ordinary skill in the art will recognize that the combination of proof mass 35 with flexures form a mass-spring system that has a natural resonance frequency along respective input axes 15.

Preferably, the mass-spring system formed by the combination of link 40 with pivot flexures and support members has a resonant frequency essentially matched to that of the mass-spring system formed by proof mass 40 and hinge flexures such that the motion of the link/flexure system does not couple into that of the proof mass/flexure system.

The first and second accelerometers are analog electrostatic force-rebalance accelerometers as taught, for example, in each of U.S. Pat. No. 5,350,189 and 5,205,171. Analog force-rebalance accelerometers have distinct advantages over the vibrating beam accelerometers used in the rate and acceleration sensors of the prior art as exemplified by U.S. Pat. No. 5,241,861. One advantage of the analog force-rebalance accelerometers in the rate and acceleration sensor of the present invention is that noise can be filtered with a quadratic low-pass filter at the signal source whereby random walk can be confined to a relatively narrow range on the order of 0.05 deg/hour over a relatively wide bandwidth, for example, a 150 Hz bandwidth. Another advantage is that axis alignment using an analog sensor can be implemented by the relatively simple means of summing an off-set voltage to the capacitor motor plates. By feeding back a sine demodulated rate channel output, a high bandwidth servo loop can continuously null the major bias error source and compensate for thermal stresses, mechanical packing stresses, initial processing errors and wafer flatness errors. Also, analog force-rebalance accelerometers are typically operated in one atmosphere pressure which reduces sealing integrity requirements to limits readily realizable using conventional sealing methods, such as welding. The magnetic dither drive described herein provides sufficient force to drive the mechanism in one atmosphere ambient pressure.

The dithered accelerometers are driven magnetically. As discussed above, the two dithered accelerometers (accels) are connected by a link 40 and preferably operate at a dither frequency of about 8 kHz. The two proof-masses are an "H" shape of approximately 1.2 mm high by 2.5 mm high. On the proof mass and the dither frame are electrodes for the force rebalanced accelerometer. These are on an oxide layer and are the active electrodes.

Upon application of the dithering motion, accelerometers move back and forth in a substantially parallel relationship to each other due to the "S-bend" flexing of the dither flexures. The bending motion resembles two smooth curves, the first terminating at the center point in one direction and the second curve with an opposite curvature meeting the first curve at the center point. "S-bend" four pairs of dither flexures ensure that accelerometers move in an essentially linear motion, whereby the horizontal and vertical edges of proof masses 35A and 35B remain precisely parallel with the inner horizontal and vertical peripheral edges of accelerometer frame 45.

The back-to-back orientation of accelerometers ensures that the summed outputs of the accelerometers provide an accurate indication of linear acceleration. In addition, extraneous movements acting on the accelerometers will, at least to a first order of measure, tend cancel or dampen each other, whereby extraneous signals do not appear in the summed accelerometer outputs. In an analogous fashion when the difference of outputs of the accelerometers is taken, the canceling characteristics of these curves ensure that second order nonlinearities in the resultant angular rotation signal will also average.

Figure 2:
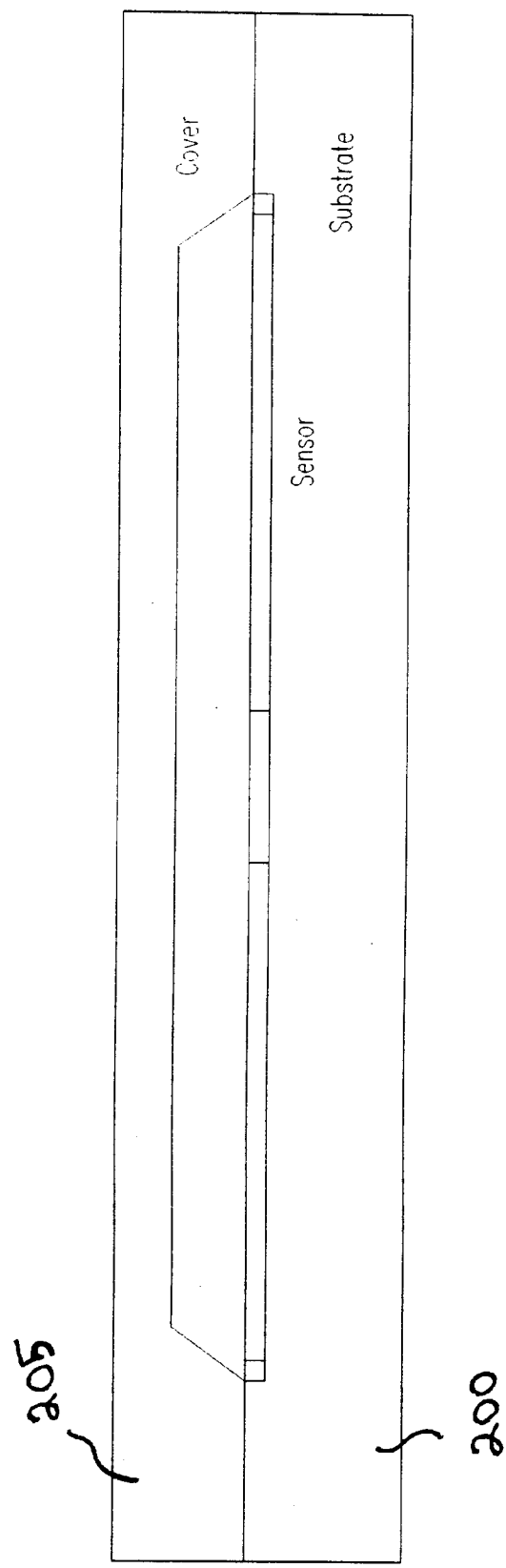
FIG. 2 is a diagram of a sensor stack-up in accordance with one embodiment of the present invention.

In accordance with the preferred embodiment of the present invention, the sensor is self contained on one silicon wafer. Therefore, the sensor thickness can be defined by an SOI (Silicon On Insulator) wafer top layer, for example. The upper sensor layer in which accelerometers are formed is positioned parallel to a lower handle layer as illustrated in FIG. 2. The two wafers are bonded at an oxide layer. The upper sensor layer can be thinned to the desired thickness. The buried oxide acts as an etch stop for a wet etch such as TMAH (tetramethyl ammonium hydroxide) or DRIE. The oxide can be chemically removed or otherwise etched away. Thus, the sensor is easily fabricated using RIE down to the oxide. The handle wafer can be removed by potassium hydroxide (KOH) etch down to the oxide, then the exposed oxide can be removed by chemical etch.

Due to being a self contained sensor, the electrical connections are only on one layer, the upper sensor layer. The device is defined by the inherent accuracy of one mask. For example, there is no need to align the upper and/or lower cover wafers for the device to function. In addition, the accelerometer input axes 15 are defined in-plane of the silicon, which means the gaps can be precisely set by the mask, rather than etching and bonding of cover plates, thereby resulting in a better performance of the sensor. The accelerometer is a translational mass instead of a pendulous mass, which means that the accelerometer axis does not change direction with g-input, which is beneficial to the performance. Moreover, the orthogonality of the accelerometer axis with respect to dither is defined in the mask orthogonality which is not a function of RIE process orthogonality which is not as good or uniform over the entire wafer. This reduces the single largest error source in a Coriolis sensor—quadrature acceleration coupling into the rate axis.

Accordingly, the sensor sandwich consists of the substrate with upper cover plate as shown in FIG. 2. The top cover plate 205 has windows etched over the electrical pad connections. After the sensor substrate details are cut with the DRIE, an electrical contact is made to the substrate by a metal contact. This substrate contact applies a voltage to the entire structure. The sandwich is put together using a glass frit screened on in a continuous square on the top cover plate. Preferably, a 12 μm gap is established on the covers using a short KOH or DRIE etch to define the frit thickness.

During operation, each of the accelerometers balance the externally applied acceleration forces by applying electrical restoring forces to proof masses 35 through upper and lower electrodes. Both AC and DC signals are applied to upper and lower electrodes. Capacitances formed between upper electrode and a first side of proof masses 35 and between lower electrode and a second side of proof masses 35 are coupled to a force-rebalance circuit which is discussed in detail below. The force-rebalance circuit drives an electrostatic restoring force based on the difference in capacitance thereby balancing the applied acceleration forces to restore each of proof masses 35 to a neutral position between opposing lower and upper capacitor plates in frame 45.

Force-Rebalance Circuit

During operation, an applied acceleration causes relative motion between proof mass 35 and upper and lower electrodes as proof masses 35 attempt to translate about proof mass flexures. An imbalance in capacitances between proof masses 35 and upper and lower electrodes results. The sensor circuitry balances the capacitance imbalance by applying an electromotive force (EMF) to each of upper and lower restoring electrodes to move each proof mass 35 to a neutral position between upper and lower electrodes and hold it there. For example, as proof mass 35 moves and approaches one of upper electrodes and simultaneously recedes from the lower electrode, an increased capacitive pickup of the AC signal causes a compensation circuit to apply a decreased DC signal voltage to the approaching electrode and to increase the signal voltage applied to the receding electrode, whereby an electrostatic force is applied to each proof mass 35 to resist the force of acceleration and restore each proof mass 35 to a neutral position.

The polarity of upper and lower electrodes are arranged to form the a accelerometer having a positive output in response to a positively applied acceleration force and a second accelerometer having a negative output in response to a positively applied acceleration force, whereby the sensed acceleration is determined by taking the difference between outputs of first and second accelerometers, and the Coriolis rate is determined by demodulating the sum of the outputs of first and second accelerometers.

Figure 3:
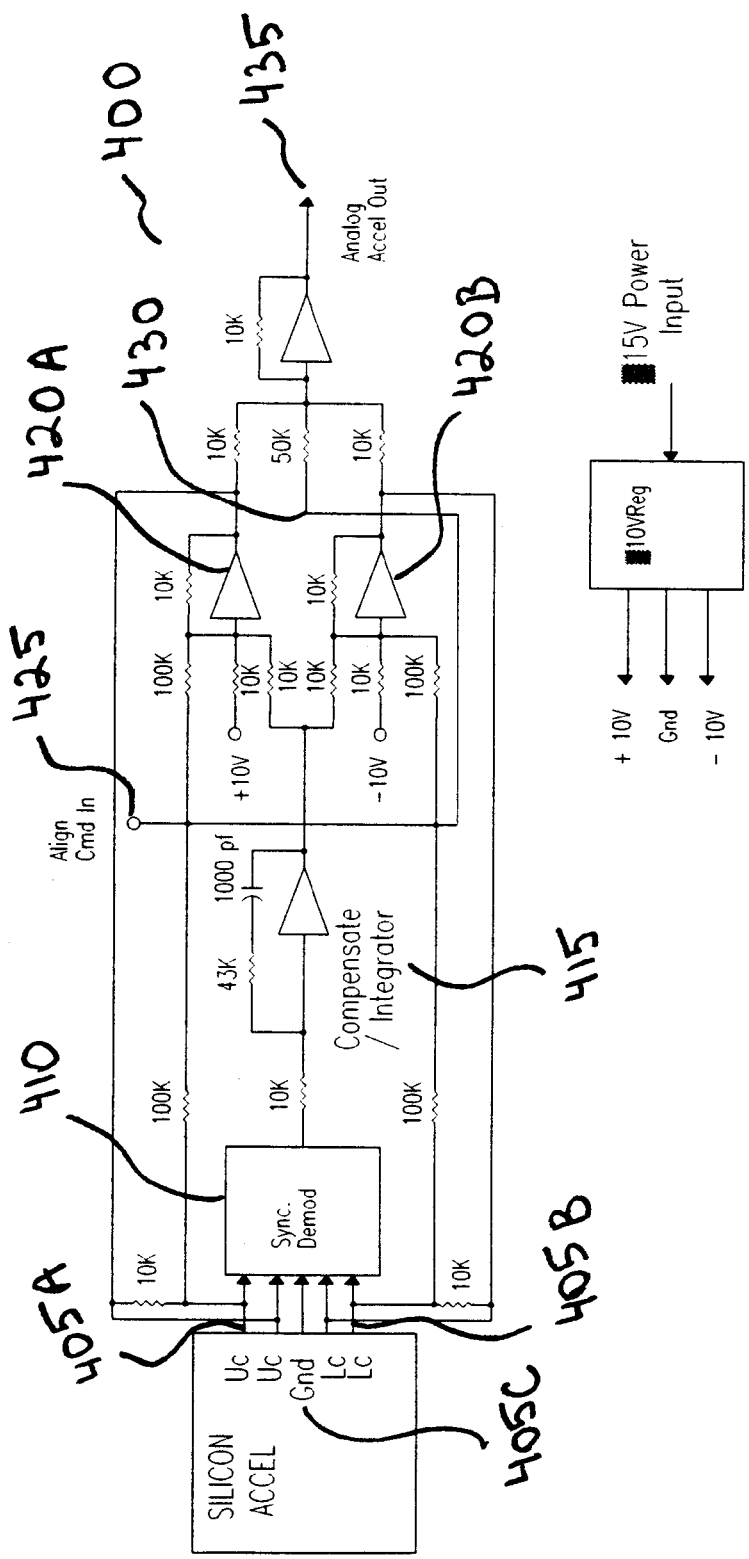
FIG. 3 is a diagram of an accelerometer force rebalance circuit in accordance with one embodiment of the present invention.

FIG. 3 illustrates one example of an accelerometer force-rebalance circuit. Other useful circuits are known to those of ordinary skill in the pertinent art, for example, each of U.S. Pat. No. 4,336,718 and U.S. Pat. No. 5,205,171 teach useful accelerometer force-rebalance circuits.

The force rebalance accelerometer circuit is shown in FIG. 3. It consists of a differential capacitance detector, compensation amplifier, offset bias amplifiers and output summing amplifier. In the accelerometer force-rebalance circuit 400, the signal of upper electrodes of sensor assembly is output at 405A, the signal of lower electrodes is output at 405B, and the signal of proof mass 35, which is a center tap in this embodiment, is output at 405C. Output signals 405 are input to synchronous demodulator 410 of known design. The output of synchronous demodulator 410 feeds a compensation integrator circuit 415. The output of compensation integrator circuit 415 is inverted by inverting operational amplifiers 420a and 420b and summed separately into each offset and each electrode. Accelerometer force-rebalance circuit 400 also provides for the alignment voltage to be summed into the feed-back signal at node 425 and subtracted from the output at node 430, whereby the summing in of the alignment signal is transparent, i.e. not visible, in the analog accelerometer output signal 435.

The proof mass capacitance of each plate of the pick-off capacitors of the accelerometer is preferably about 3 pf with a nominal 5 $\mu$m gap. So a capacitive pick-off circuit is used as the front-end circuit. A simple gain amplifier, which doubles as a compensation integrator 415 (integrates out to about 4 kHz, then is just a fixed gain) is the only compensation circuit needed because the gas damping is set-up for Q=8 at 8 kHz. The electrodes are preferably biased off at +6 VDC.

According to another embodiment of the present invention, a single 5V supply circuit can be designed. The output of the pick-off feeds the compensation integrator, which is summed in separately to each offset and electrode. The polarity of the electrodes is set-up to form a plus and minus accel so that acceleration is the difference of the accels and rate is the demodulated sum of the accels. The quadratic filter on the output of the rate channel acts as a bandwidth limiter, noise reducer and ripple eliminator. The ripple will be down 90 dB at the output.

The channel block diagram is shown in FIG. 3. A difference amplifier forms the linear acceleration output. A low-pass filter is used to set the bandwidth and filter out any remaining dither induced rate signals. A summing amplifier is used for the rate AC signal path that can be amplified to increase sensitivity. This signal is then demodulated to form a rate proportional voltage. Similarly, a low-pass filter sets the bandwidth and reduces the ripple to be compatible with a 16 bit A/D converter at 80 Hz. The dither loop is a closed loop oscillator that runs at the natural frequency of the silicon mechanism. The velocity is sensed and used to drive the accelerometers perpendicular to their input axes. The output of the loop is used as an input to a 90 degree phase shifter to drive the rate channel demodulator. Since the accelerometer bandwidth is set exactly to the dither frequency, there is a 90° phase shift of the rate data. The phase shifter matches this as well as filtering the dither crossing noise.

To do the active axis-alignment a sine demodulator can be used and fed-back as an offset to the servo loops. This will couple in a small amount of the turnaround acceleration from the dither to cancel any sine modulation from any source, such as thermal, mechanical package stress, processing errors and wafer mask errors.

Figure 4:
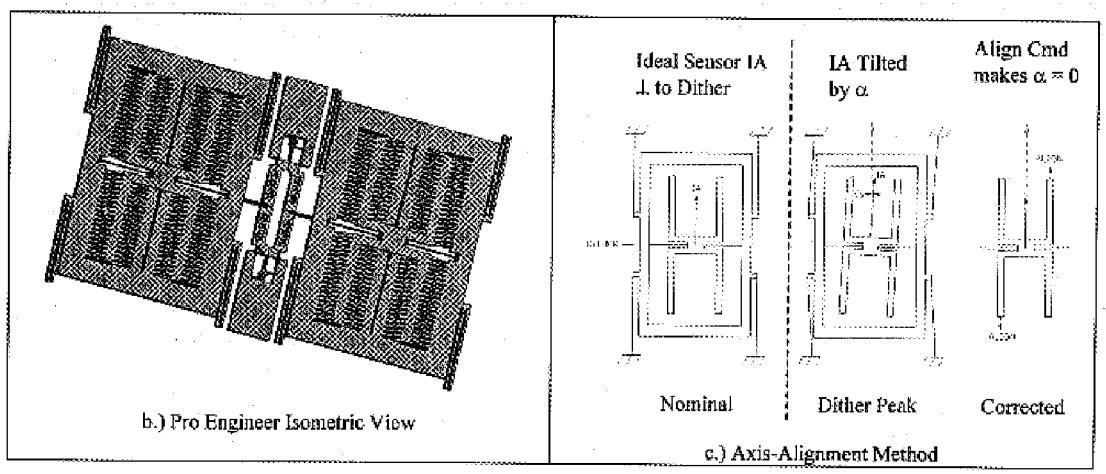
FIG. 4 is a diagram illustrating an axis alignment method in accordance with one embodiment of the present invention.

Referring to FIG. 4, in accordance with the preferred embodiment of the present invention, in order to achieve the end goal of 1°/hr bias stability, it is preferable to servo the orthogonality of the accelerometer sense axes to the dither axes. This is achieved through capacitive offset of the accelerometer input axis. The four capacitor plate sections allow the proof mass "H" to be slightly rotated about the middle by applying an offset voltage to diagonal ends of the "H" as illustrated in FIG. 4. This will require a circuit design to allow both a force rebalance top to bottom of "H" offset and axis-alignment or diagonal corner offset be applied at the same time to null the input axes. Thus, quadrature signal rejection can be done at the source to eliminate a large bias error. Secondly, two blocks are dithered in opposite directions to reduce base reactions. They are linked to allow stable operation in the presence of vibration and to dynamically remove linear acceleration from the rate channel by summing and differencing of the two readings. This approach greatly simplifies the design and processing aspects of the prior art three-dimensional approach.

Spring Cancellation feature

In accordance with another embodiment of the present invention, a method of improving the accelerometer bias performance is provided through a cancellation of the mechanical spring by adding a bias voltage across the motor capacitor gaps. The motor capacitor consists of a stator plate located on the dither frame and a proof mass plate located on the movable proof mass which is electrically coupled to the substrate upper sensor layer. A large negative voltage is applied to the substrate, but the motor plate stays at a relatively small positive value. The result is a large static field across the gap causing an attractive force. As the smaller of the two gaps to the capacitor fingers are mirror images about the proof mass flexures there is a balanced bias force, the top half pulling the proof mass up and the bottom half pulling the proof mass down. The net result is a cancellation of static forces except as commanded to the motors by differentially changing the top motor voltage with respect to the bottom motor voltage. However, as the motor force is proportional to the voltage squared, the bias voltage now enters into the commanded force as $(V_{bias}) \times (V_{command})$, or a larger product than just the $V_{command}$ squared. Thus, not only does the bias cancel the mechanical flexure spring, but it also magnifies the motor force allowing a greater g-range to be within servo control.

For example, the proof mass natural frequency is 5500 Hz due to the mass and flexure suspension. A bias voltage of 54V can be added by using a –47V supply connected to the sensor substrate and a +6V electrical offset to the motor terminals on the insulated gold metallization. This results in an attractive force that has a negative spring rate. In other words, the attraction increases as the gap grows smaller, thereby effectively canceling the mechanical spring. The proof mass natural frequency drops from the 5500 Hz to less than 400 Hz when the bias is applied. This reduces the bias errors induced by anything that changes the capacitor null.

For example, a 1 mV null error would have produced a 60 mg error without the bias would now be less than 5 mg's. The same is true for mechanically produced position changes.

Sensor Assembly

Figure 5:
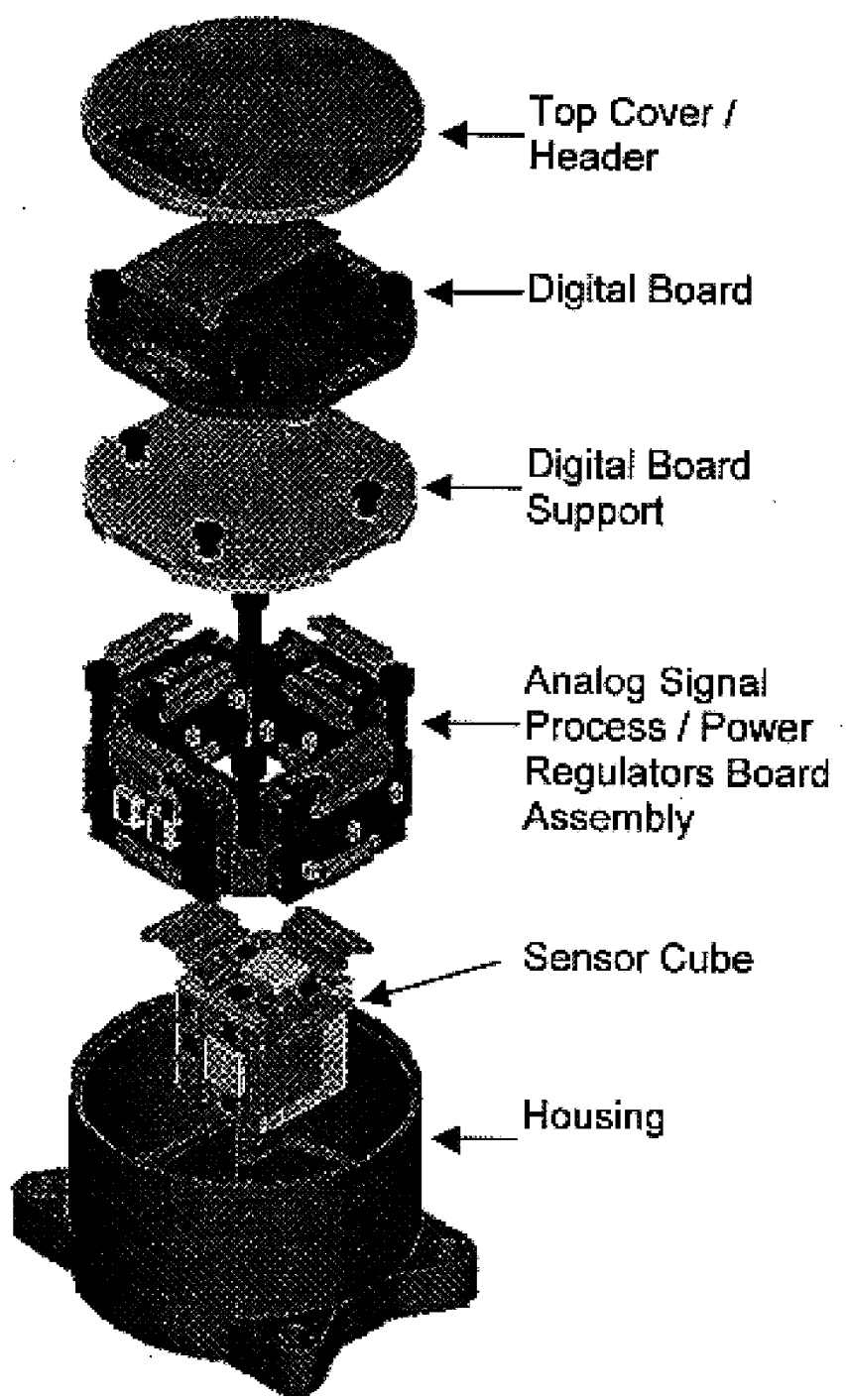
FIG. 5 is a diagram of an inertial measurement unit in accordance with one embodiment of the present invention.

Referring to FIG. 5, the IMU includes a baseplate including one or more mounting flanges. Cubic return path is securely mounted to baseplate and supports a nonmagnetic sensor mounting structure, upon which one or more analog control boards are mounted. Three completed sensors can be mounted on the adjacent faces of a cubic return path. Magnetic flux generators are mounted on the adjacent faces of a cubic return path under each sensor in a non-critical location to the sensor's middle 0.2" by 0.1" area. Magnetic flux generators are, for example, permanent magnets or electromagnets, or suitable another magnetic flux generator of a type known to those of skill in the pertinent art. Each sensor will have a surrounding electronics hybrid to run the drive frequency and the two force rebalance accelerometers. Each analog control board supports a sensor assembly including an upper sensor layer having first and second accelerometers formed therein such that their respective input axes are disposed in parallel but opposite directions. Each accelerometer is electrically interconnected to its respective control board which is in-turn interconnected by, for example, flex strip to analog processing circuitry. The analog processing circuitry performs all of the aforementioned signal processing to allow for outputting angular rate and linear acceleration data to a central processing unit (CPU) via another flex strip (not shown).

A top cover seals in a prescribed atmosphere and protects the sensitive mechanical and electrical components from contamination and damage. The sealed in atmosphere is preferably a standard dry nitrogen at one standard atmosphere pressure.

Magnetic Dither Drive

Dither drive circuits are known to those of skill in the pertinent art. For example, U.S. Pat. Nos. 5,241,861 and 4,590,801 illustrate such circuits. The invention uses a commonly known dither drive circuit to apply a sinusoidal voltage across the effective portions of conductive dither path. Conductive dither path forms first effective portion deposited on beams or dither legs 30 of dither flexures for imparting a vibrating motion to the first accelerometer and second effective portion similarly deposited on beams or dither legs 30, of dither flexures for imparting a vibrating motion to the second accelerometer. A magnetic field is generated perpendicular to the surfaces of the upper sensor layer and is directed through accelerometers and the effective portions disposed thereon. Effective portions are connected in series between external connectors. A single drive voltage applied to effective portions through external connectors generates a current in external connectors. The flux generated by the magnet interacts with the current flowing through the effective portions to create a dither drive force F which moves accelerometers in a substantially rectilinear, vibrating movement back and forth along dither axes 20.

Accelerometers vibrate or dither at their resonant, natural frequency $f_o$ determined by the mechanical characteristics of the sensor assembly, including the spring rates of proofinass flexures and the mass of accelerometers. The dither drive signal outputted by the dither drive circuit is of a frequency corresponding to the frequency $f_o$ of dither vibration and, as explained above, is used in the further processing of the accelerometer outputs to demodulate those signals to provide a force signal F and a rotational signal $\Omega$.

The conductive dither pick-off path is deposited on the top surface of the upper sensor layer, whereby a pick-off signal is generated which represents the dither motion imparted to accelerometers by the dither drive current passing through conductive dither path. As accelerometers are vibrated, effective pick-off portions move through the magnetic field created by the unitary magnet, a current is induced therein and the resultant voltage is fed back to the dither drive signal.

The configuration of accelerometers within the upper sensor layer and flux path generated by magnet, case return and cubic return path develops a considerable force in excess of the damping losses to maintain the dither motions of accelerometers. Those of ordinary skill in the art understand that a minimum turn-around acceleration is needed to cause each of accelerometers to stop going in one direction and to accelerate in the opposite, whereby the dithering motion may occur. The acceleration force F tending to maintain the dithering motion of accelerometers is set out by the following equation:

$$F = L \cdot i \times B \quad \text{Equation (1)}$$

where i is the current passing through the conductive path making up the effective portions, L is the effective length of that portion of the conductive path within the magnetic flux passing through accelerometers, i.e., the length of the effective portions, and B is the magnitude of the flux.

The drive acceleration a may be calculated by the following equation:

$$a = \frac{D(2\pi f)^2}{K} \quad \text{Equation (2)}$$

where D is the displacement, f is the dither frequency and K is a conversion factor.

The voltage induced in the pick-off portions, $\epsilon$, is provided by the following equation:

$$\epsilon = v \times B \cdot L \quad \text{Equation (3)}$$

where v is the amplitude of the velocity output signal of accelerometers; B is the strength of the magnetic field crossing the effective portions; L is the effective length of the conductor within the magnetic flux field.

The accuracy with which rate and acceleration sensor 10 may be made, the symmetry of accelerometers and their suspension by the flexures, and the interconnection of link 40 to impose equal and opposite motions on accelerometers, have an accumulative effect to greatly simplify the processing of the accelerometer output signals, essentially reducing it to a cosine demodulation step. This can be done every half cycle as was shown in the prior art. Basically, the outputs of accelerometers are subtracted from each other to provide the linear acceleration signal and to average both signals while inverting every other sample to demodulate for the cosines to produce a rate of rotation signal $\omega$. Neither an alignment servo nor a phase servo is needed for such processing thus increasing the band width of the rotational acceleration signal $\Omega$ to be 0.5 kHz in one illustrative embodiment of this invention.

Rate and acceleration sensor 10 has a sensitivity to rotational acceleration imposed about its rate axis, i.e., the moment of each of accelerometers about rate axis, which acceleration sensitivity will introduce an undesired noise component in the subsequent demodulation processing of the accelerometer output signals. As taught in U.S. Pat. No. 5,241,861, that noise component can be effectively eliminated by differentiating the rotation rate signal $\omega$ and scaling it. In effect, the demodulated outputs of accelerometers are a measure of its rotation rate signal ω, which can be differentiated to obtain an indication of the angular acceleration of each accelerometer. Since the dimensions and, in particular, the distance between rate axis and each of center of gravity is known to a high degree of precision, that equivalent radius of rotation is multiplied by a measured angular acceleration force to obtain an accurate indication thereof of the linear acceleration caused by the angular acceleration. The calculated acceleration moment is subtracted from the accelerometer outputs to reduce or substantially eliminate such acceleration sensitivity.

Figure 6:
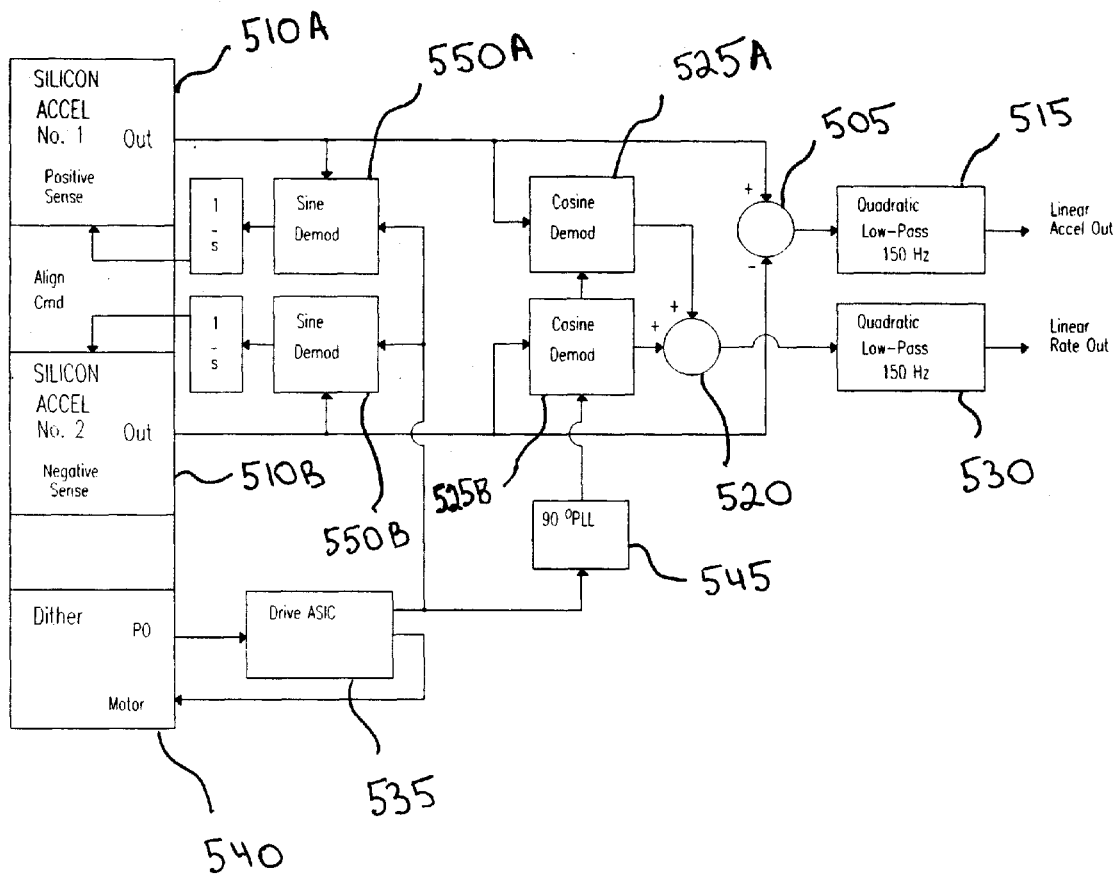
FIG. 6 is a block diagram of electronic circuitry in accordance with one embodiment of the present invention.

FIG. 6 shows the channel block diagram which includes a difference amplifier 505 to form the linear acceleration output from accelerometers 510A and 510B. A low pass filter 515 is used to filter out any remaining dither induced rate signals in the linear acceleration output. The acceleration output signals are demodulated in cosine demodulator 525A and 525B to form rate proportional voltages. A summing amplifier 520 is used to amplify the cosine demodulated signals to increase sensitivity. Similarly, a low-pass filter 530 sets the bandwidth and reduces the ripple such that the signal is compatible with an analog-to-digital (A/D) converter, for example, a 16-bit analog-to-digital converter at a 80 Hz data rate.

The dither drive circuit 535 may take the form of that circuit shown in U.S. Pat. Nos. 5,241,861 and 4,590,801 which illustrate such circuits or another suitable dither drive circuits as are known to those of skill in the pertinent art. Dither drive circuit 535 is a closed loop oscillator that runs at the natural frequency of sensor assembly 540. The velocity is sensed by dither pick-off circuit and used in dither drive circuit to drive accelerometers perpendicular to acceleration input axes 15. The output of the dither drive loop is used as an input to a 90 degree phase shifter 545 to drive the rate channel demodulator. Active axis alignment is performed by sine demodulators 550A and 550B which feed back offsets to the servo loops of accelerometers 510. A small amount of the turn-around acceleration from dither drive circuit 535 is used sine demodulators 550A and 550B to cancel any sine modulation from sources such as thermal stress, mechanical packaging stress, processing errors and wafer mask imperfections.

CPU Description

Figure 7:
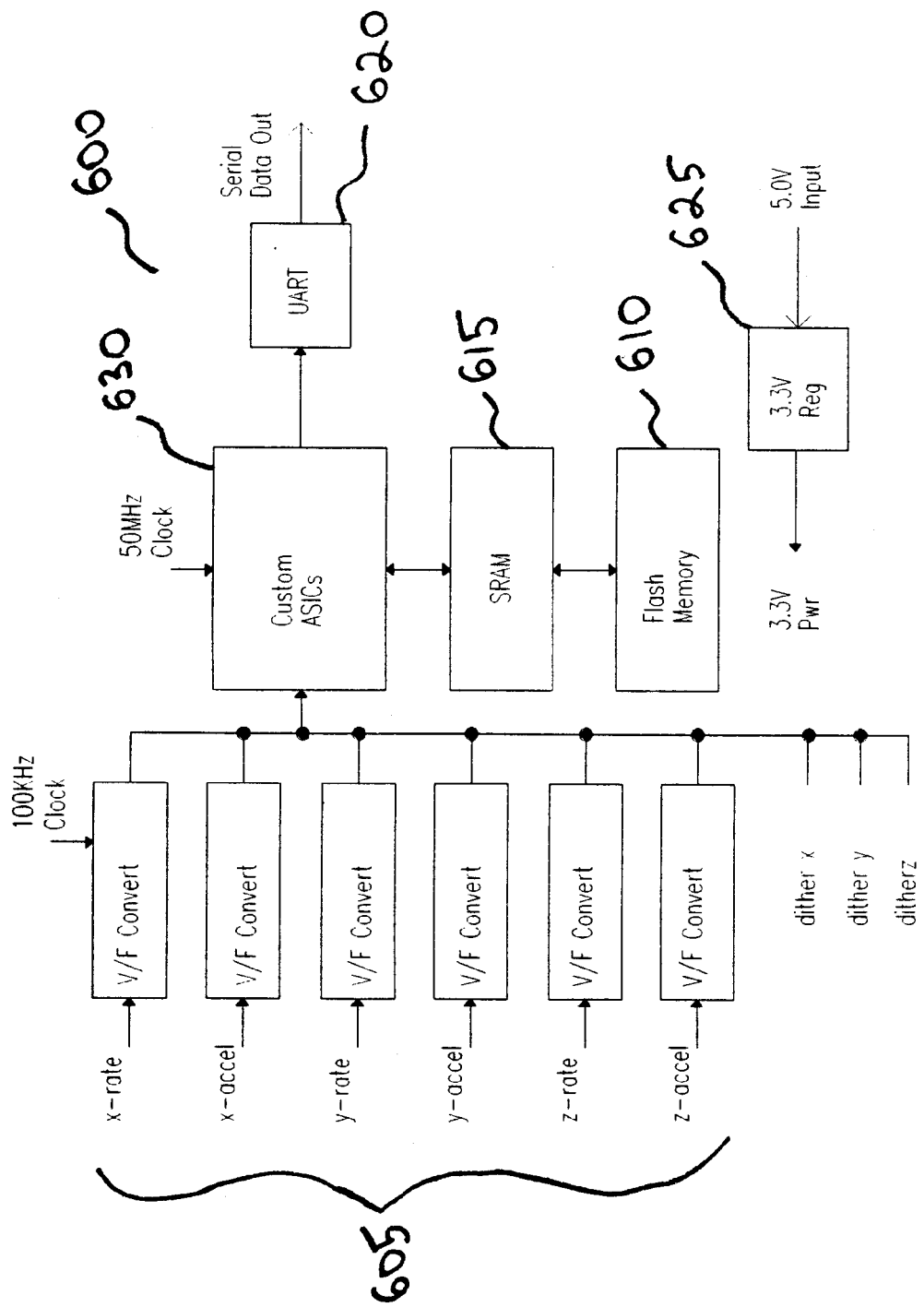
FIG. 7 is a block diagram of a central processing unit in accordance with one embodiment of the present invention.

FIG. 7 illustrates the central processing unit (CPU) 600 in which the six analog sensor outputs from the three sensor assemblies mounted on orthogonal faces of cubic return path are converted to a digital format using V/F converters. A bank of V/F converters 605 continuously read the rate and acceleration voltages and output from each of the three sensor assemblies and output a digital frequency that is a conversion to a 24 bit resolution data word using a digital ASIC counter 630. Data rates of 1440 degrees/second can be resolved to a 1 degree/hour rate using a 24-bit resolution data word. Central processing unit 600 is optionally a generally available low cost micro-controller type (ASIC) capable of handling the data reads, correcting for bias and scale factor over temperature using computer models, and correcting for axis misalignment, whereby corrected data is provided to a host computer for the performance of navigation functions. The inertial measuring unit (IMU) processor would require an external circuit card or could be integrated in functionally with the host processor. Central processing unit 600 further preferably includes flash memory 610, random access memory (RAM) 615, a serial universal asynchronous receiver-transmitter (UART) 620 and a voltage regulator 625, for example, 3.3V regulator as shown in FIG. 6.

As explained in detail in above incorporated U.S. Pat. No. 4,786,861, Δv is provided by the following equation:

$$\Delta v_i = A[(N1_i - N2_i) + FT + B(N1_i + N2_i)] \qquad \text{Equation (4)}$$

where $v_i$ is the "ith" sample of the velocity signal, A and F are scale factors, $N1_i$ is the count derived from a first counter over a 1 k Hz (1 m sec) period for the "ith" sample, $N2_i$ is the count obtained from a second counter for the "ith" sample, T is the time period and B is the bias correction term. As well known in the art, $\Delta\theta_i$ is provided by the following equation:

$$\Delta\theta_i = a(\cos N1_i + \cos N2_i) + b(\cos N1_i - \cos N2_i) \qquad \text{Equation (5)}$$

where a is a scale factor and b is a bias/correction term, and $$\cos(N1_i) = N1_i - N1_{(i-1)}, \text{ over each 8 kHz period or} \qquad \text{Equation (6)}$$

$$\cos(N1_i) = (-1)^i N1_i, \text{ at 8 kHz rate.} \qquad \text{Equation (7)}$$

Angular acceleration α is equal to the linear acceleration as derived from the output of either of accelerometers, divided by the equivalent radius of rotation, $r_{eq}$ in accordance with the following equation:

$$\alpha = A_{linear}/r_{eq} \qquad \text{Equation (8)}$$

In turn, angular acceleration α is a function of the measured rotation rate ω in accordance with the following equation:

$$\alpha = d\omega/dt \qquad \text{Equation (9)}$$

In turn, the rotation rate may be expressed as follows:

$$\omega = d\theta/dt \qquad \text{Equation (10)}$$

Since the derivative of the rotation rate ω is equal to acceleration α, acceleration may be expressed by the following equation:

$$\alpha = \frac{\omega_i - \omega_{(i-1)}}{\Delta t} = \frac{\frac{\Delta\theta_i}{\Delta t} - \frac{\Delta\theta_{(i-1)}}{\Delta t}}{\Delta t} \qquad \text{Equation (11)}$$

Thus, correction for linear acceleration $A_{linear}$ is provided by the following equation:

$$A_{linear\_correction} = \alpha r_{eq.} = r_{eq.} \frac{\omega_i - \omega_{(i-1)}}{\Delta t} = r_{eq.} \frac{\frac{\Delta\theta_i}{\Delta t} - \frac{\Delta\theta_{(i-1)}}{\Delta t}}{\Delta t} \qquad \text{Equation (12)}$$

In turn, the microprocessor is programmed in a conventional fashion to subtract values of $A_{linear}$ correction from the accelerometer outputs f1 and f2 to correct for angular acceleration.

Technical Sensor Design Advantages

An analog sensor with adequate rate sensitivity can meet the low random walk numbers over a 80 Hz bandwidth rather easily. This is because the noise can be filtered with a quadratic low-pass filter at the signal source. With an analog sensor, axis-alignment can be implemented by summing in an offset to the capacitor pick-off plates. By using a sine demodulated rate channel output, a high bandwidth servo loop can continuously null the major bias error source and compensate for thermal, mechanical package stress, initial processing and wafer mask errors. Another big advantage will be to run the mechanism in a one atmosphere pressure since this reduces the hermeticity requirement to a readily achievable level. This works well with the large package volume of 2–3 cubic inches instead of trying to seal six separate sensors with a very tiny IC package. By using a magnetic drive, there is sufficient force available to drive the mechanism at a one atmosphere ambient.

The silicon sensor design has evolved from an all KOH design which is well know in the prior art, through several versions of DRIE through the wafer designs. The concept in accordance with the present invention is a uniform projection through only the top 12% of the wafer thickness. This significantly simplifies the design as there are no interactions between KOH process steps and DRIE steps. Also, feature smoothness is greatly enhanced as the DRIE process is very good for cuts below 200 μm in depth. The design incorporates benefits such as symmetry, immunity to processing variations and servo rebalance to improve performance.

In accordance with yet another embodiment of the present invention, an advantage in this sensor design is that the entire rate sensor and accelerometer are defined by a single processing mask. This approach differs from typical surface micromachining in that the current sensors use a lightly doped silicon substrate to form the sensor mechanism. This gyro approach is inherently more stable than a polysilicon surface micromachined sensor or other surface micromachined sensor that uses a heavily doped silicon layer as its sensing element. This design will allow a mature, rapid process to cut just about any shape projected to the desired thickness. Finite Element Analysis is more straightforward since the sensor is just the sensor geometry extruded into a uniform thickness. Models are easier to build and run, and they are a very exact approximation to the actual silicon shape realized by DRIE. The silicon mask also becomes easier since it is just a single oxide mask without corner compensation for complex three-D shapes. The result of the above advantages is a greatly reduced design/fab/test cycle time. A silicon iteration can be done in a third to half of the time of bulk machined designs well known in the prior art. The hidden advantage with a projection type sensor is the inherent "center flexure" design of having the z-axis CG (center of gravity) located precisely at the mid-point of the sensor layer thickness. A center flexure, which will greatly reduce unwanted modes, is difficult to achieve with prior art bulk silicon designs.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

In addition, to the extent needed to understand any of the components or features that are included in the present invention, the disclosures of any and all of the patents mentioned herein are expressly incorporated by reference thereto.

What is claimed is:

1. An apparatus for measuring the angular rotation of a moving body, the apparatus comprising:
   an upper sensor layer;
   a lower handle layer substantially parallel to the sensor layer;
   at least one dither frame formed of the upper sensor layer, the frame having a dither axis disposed substantially parallel to the upper sensor layer and the lower handle layer;
   a first accelerometer formed of the upper sensor layer and having a first force sensing axis perpendicular to the dither axis for producing a first output signal indicative of the acceleration of the moving body along the first force sensing axis, the first accelerometer having a proof mass and at least one flexure connecting the proof mass to the dither frame such that the proof mass can be electrically rotated perpendicular to the dither axis;
   a second accelerometer formed of the upper sensor layer and having a second force sensing axis perpendicular to the dither axis for producing a second output signal indicative of the acceleration of the moving body along the second force sensing axis, the second accelerometer having a proof mass and at least one flexure connecting the proof mass to the dither frame such that the proof mass can be electrically rotated perpendicular to the dither axis;
   the dither frame and proof masses having electrodes on an insulating layer for operating the first and second accelerometers; and
   the upper sensor layer having a rate axis perpendicular to each of the first and second force sensing axes and the dither axis, whereby the first and second output signals have a Coriolis component indicative of the angular rotation of the moving body about the rate axis.

2. The apparatus of claim 1, wherein the lower handle layer is bonded to the sensor layer at the insulating layer.

3. The apparatus of claim 1, wherein the insulating layer is an oxide layer.

4. The apparatus of claim 1, wherein the insulating layer acts as an etch stop for an etching method.

5. The apparatus of claim 4, wherein the etching method is a potassium hydroxide or tetramethyl ammonium hydroxide method.

6. The apparatus of claim 1, wherein the proof masses of the first and second accelerometers are of H shape.

7. The apparatus of claim 1, wherein the first and second accelerometers are connected by a link.

8. The apparatus of claim 1, wherein the dither frame is driven magnetically, while the first and second accelerometers are driven capacitively.

9. The apparatus of claim 1, wherein the first and second accelerometers are translational masses.

10. The apparatus of claim 1, further comprising first and second capacitor plates positioned perpendicular to and spaced between the upper sensor layer and the lower handle layer.

11. The apparatus of claim 10, wherein each of the first and second capacitor plates comprise the electrodes.

12. The apparatus of claim 11, wherein the first and second accelerometers comprise capacitive force rebalance accelerometers.

13. The apparatus of claim 12, further comprising a force-rebalance circuit coupled to the first and second accelerometers for balancing applied acceleration forces to restore each of the proof masses to neutral position between the first and second capacitor plates.

14. The apparatus of claim 13, wherein the first and second force rebalancing accelerometers include an electronic bias voltage for cancellation of mechanical forces.

15. The apparatus of claim 1, wherein the apparatus is operated at one atmosphere pressure and a predetermined dither frequency is nominally 8 kHz.

16. The apparatus of claim 1, wherein the pair of flexures each comprise at least one dither leg.

17. The apparatus of claim 1, further comprising a magnetic circuit generating a magnetic flux that intersects the at least one dither frame.

18. The apparatus of claim 17, further comprising a conductive path deposited on at least one of the flexures.

19. The apparatus of claim 18, further comprising an electrical circuit coupled to the conductive path and generating a drive signal therein, the drive signal interacting with the magnetic flux to impart a dithering motion to each of the first and second accelerometer frames having a predetermined frequency along the dither axis to generate the first and second output signals.

20. The apparatus of claim 19, wherein the electrical circuit includes a signal processor for processing a pick-off signal and further comprising:

a second conductive path disposed on the upper sensor layer to traverse the first and second accelerometer frames, the second conductive path coupled to the electrical circuit and intersected by a magnetic flux which generates a pick-off signal in the second conductive path representative of the dithering of the first and second accelerometer frames along the dither axis.

21. The apparatus of claim 19, wherein the predetermined dither frequency and nominal accelerometer frequency are set equal.

22. A method of improving an accelerometer bias performance, the accelerometer having a force rebalance circuit coupled thereto for restoring a proof mass to its neutral position between capacitor plates, the method comprising the steps of:

adding a bias voltage across capacitor gaps by coupling a power supply to a sensor substrate; and applying an electrical offset to the motor terminals, thereby resulting in an attractive force having a negative spring rate and effectively decreasing proof mass natural frequency.

23. A method of measuring the angular rotation of a moving body, the method comprising the steps of:

forming an upper sensor layer;

forming a lower handle layer substantially parallel to the sensor layer;

forming at least one dither frame of the upper sensor layer, the frame having a dither axis disposed substantially parallel to the upper sensor layer and the lower handle layer;

forming a first accelerometer of the upper sensor layer and having a first force sensing axis perpendicular to the dither axis for producing a first output signal indicative of the acceleration of the moving body along the first force sensing axis, the first accelerometer having a proof mass and at least one flexure connecting the proof mass to the dither frame such that the proof mass can be electrically rotated perpendicular to the dither axis;

forming a second accelerometer of the upper sensor layer and having a second force sensing axis perpendicular to the dither axis for producing a second output signal indicative of the acceleration of the moving body along the second force sensing axis, the second accelerometer having a proof mass and at least one flexure connecting the proof mass to the dither frame such that the proof mass can be electrically rotated perpendicular to the dither axis;

the dither frame and proof masses having electrodes on an insulating layer for operating the first and second accelerometers; and imparting a dithering motion to each of the first and second accelerometers of a predetermined frequency along the dither axis, whereby the first and second output signals have a Coriolis component indicative of the angular rotation of the moving body about the rate axis.

24. The method of claim 23, further comprising the step of bonding the lower handle layer to the sensor layer at the insulating layer.

25. The method of claim 23, wherein the insulating layer is an oxide layer.

26. The method of claim 23, wherein the insulating layer acts as an etch stop for an etching method.

27. The method of claim 26, wherein the etching method is a potassium hydroxide or TMAH method.

28. The method of claim 23, wherein the proof masses of the first and second accelerometers are of H shape.

29. The method of claim 23, further comprising the step of forming a link connecting the first and second accelerometers to maintain same dither frequency between each of the first and second accelerometers.

30. The method of claim 23, further comprising the steps of driving the dither frame magnetically, and driving the first and second accelerometers capacitively.

31. The method of claim 23, wherein the first and second accelerometers are translational masses.

32. The method of claim 23, further comprising the step positioning the first and second capacitor plates perpendicular to and spaced between the upper sensor layer and the lower handle layer.

33. The method of claim 32, wherein each of the first and second capacitor plates comprise the electrodes.

34. The method of claim 33, wherein the first and second accelerometers comprise capacitive force rebalance accelerometers.

35. The method of claim 34, further comprising the step of coupling a force-rebalance circuit to the first and second accelerometers for balancing applied acceleration forces to restore each of the proof masses to neutral position between the first and second capacitor plates.

36. The method of claim 35, wherein the first and second force rebalancing accelerometers include an electronic bias voltage for cancellation of mechanical forces.

37. The method of claim 23, further comprising the step of operating the apparatus at one atmosphere pressure and dithering the first and second accelerometers at a predetermined dither frequency of nominally 8 kHz.

38. The method of claim 23, wherein the pair of flexures each comprise at least one dither leg.

39. The method of claim 23, further comprising the step of generating a magnetic flux with a magnetic circuit, the magnetic circuit disposed such that the magnetic flux intersects the at least one dither frame.

40. The method of claim 23, further comprising the step of depositing a conductive path on at least one of each of the flexures.

41. The method of claim 40, further comprising the step of coupling an electrical circuit to the conductive path and generating a drive signal therein, the drive signal interacting with the magnetic flux to impart a dithering motion to each of the first and second accelerometer frames having a predetermined frequency along the dither axis, whereby the first and second output signals have a Coriolis component indicative of the angular rotation of the moving body about the dither axis.

42. The method of claim 41, wherein the electrical circuit includes a signal processor for processing a pick-off signal and further comprising the step of:

disposing a second conductive path on the upper sensor layer to traverse the first and second accelerometer frames, the second conductive path coupled to the electrical circuit and intersected by a magnetic flux, whereby the magnetic flux generates a pick-off signal in the second conductive path representative of the dithering of the first and second accelerometer frames along the dither axis.

43. The method of claim 41, wherein the predetermined dither frequency and nominal accelerometer frequency are set equal.

* * * * *